W. T. THORP.
VEHICLE WHEEL.
APPLICATION FILED OCT. 27, 1911.

1,062,519.

Patented May 20, 1913.

Witnesses

Inventor
William T. Thorp,
By Victor J. Evans
Attorney

UNITED STATES PATENT OFFICE.

WILLIAM T. THORP, OF LITCHFIELD, ILLINOIS.

VEHICLE-WHEEL.

1,062,519.

Specification of Letters Patent.

Patented May 20, 1913.

Application filed October 27, 1911. Serial No. 657,033.

*To all whom it may concern:*

Be it known that I, WILLIAM T. THORP, a citizen of the United States, residing at Litchfield, in the county of Montgomery and State of Illinois, have invented new and useful Improvements in Vehicle-Wheels, of which the following is a specification.

The invention relates to resilient wheels and has for an object to provide a wheel, for use in connection with vehicles to produce a cushioning effect, whereby vehicles can be operated over the ground, so that the body of the vehicle will not be subjected to jouncing or vibration, caused by the unevenness of the ground.

To accomplish the desired result, use is made of a vehicle body consisting of a hub having spokes secured thereto and radiating therefrom with the outer ends of the spokes connected to a felly, a rim mounted to encircle the felly and spaced therefrom, the said rim being preferably provided with a tire, cushioning means interposed between the said rim and the said felly to permit of a circumferential and radial movement of the rim and side plates connected to the said felly and adapted to partially overlap the said rim to protect the cushioning means interposed between the said felly and the said rim.

In the further disclosure of the invention, reference is to be had to the accompanying drawings, constituting a part of this specification, in which similar characters of reference denote corresponding parts in all the views, and in which—

Figure 1:
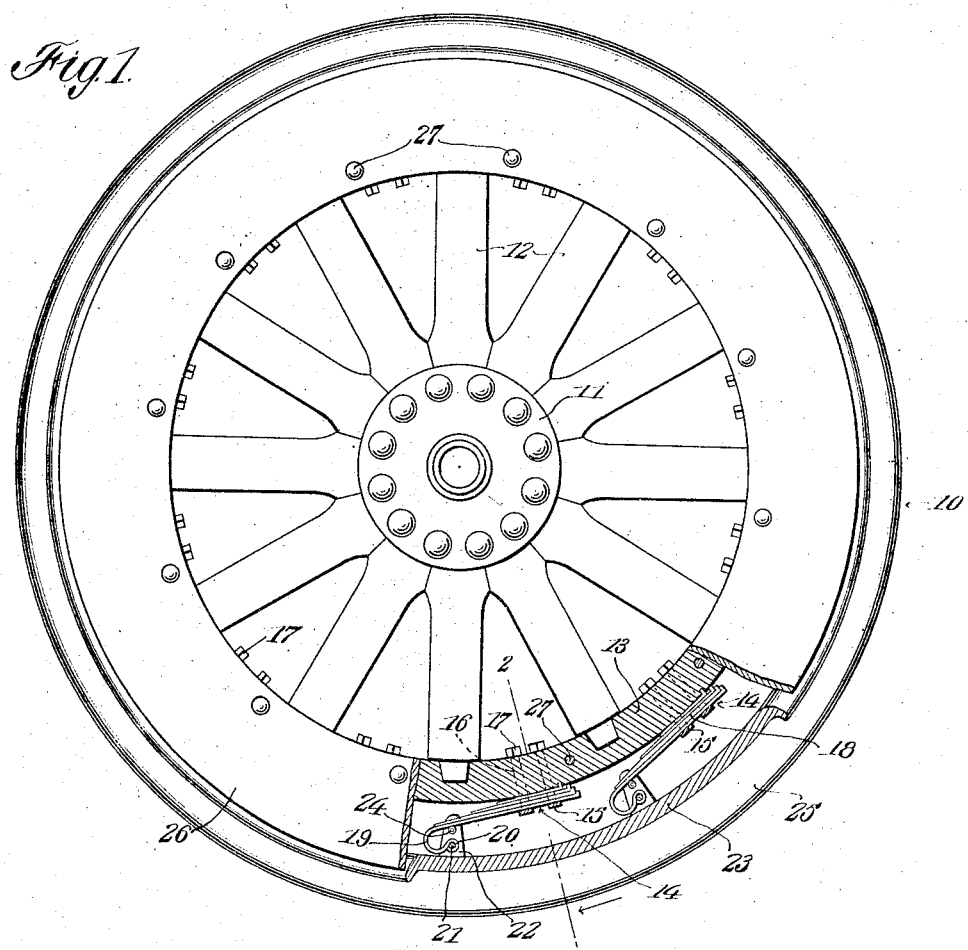
Figure 2:
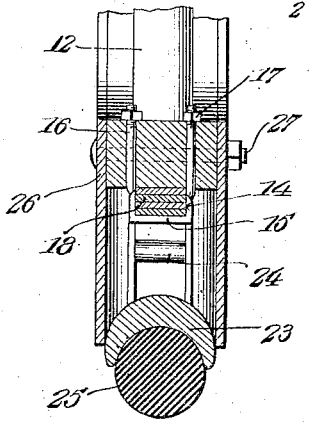

Figure 1 is a side elevation of my vehicle wheel, parts being broken away to disclose the underlying structure. Fig. 2 is a sectional view taken on the line 2—2 in Fig. 1, looking in the direction of the arrow.

Referring more particularly to the views, I provide a wheel 10, consisting of a hub 11 having spokes 12 secured thereto and extending radially outward, a felly 13 being rigidly connected to the outer ends of the spokes 12.

Spaced cushion members 14 are rigidly secured to the periphery of the felly 13 by U-shaped straps 15, provided with threaded shanks 16, passed transversely through the felly 13 and retained in rigid position by nuts 17 threadedly mounted on the shanks 16. The cushion members 14 each consist of a series of superimposed leaf springs 18, the smallest leaf spring 18 being positioned immediately adjacent the periphery of the felly 13, the succeeding springs being proportionately greater in length and the outermost leaf spring being provided with an integral extended curved portion 19, bent rearwardly upon itself and provided at its outer extremity with an eye 20 through which is received a pin 21 having the ends thereof secured in standards 22, rigidly mounted on a rim 23, having a crescent shape in cross section, a roller 24 being mounted on the standards 22 to support the outermost and adjacent leaf springs 18, the outermost leaf spring being slidable over the roller and the eye 20 being turnable relatively to the pin 21. A suitable tire 25, is mounted on the rim 23 and mounted to cover the outer sides of the felly 13 are circular side plates 26, the said side plates being secured to the felly 13 by bolts 27 passed through the felly, the outer or free ends of the side plates being adapted to partially overlap the rim 23 and slidably engage the same so that the side plates will inclose the cushion members 14, as shown in Fig. 2.

In the use of my device, when a downward pressure is exerted on the hub 11 and a torsional pressure is exerted on the tire 25, the mentioned tire 25, owing to the provision of the cushion members 14, connecting the felly 13 with the rim 23, will be movable radially and will also be capable of moving circumferentially, due to the flexibility of the cushion members 14 and the flexibility of the portion 19 of each of the cushion members 14, thus any jar or vibration caused by the frictional engagement of the tire 25 with the ground and the contact of the tire 25 with uneven places will be absorbed by the cushions 14, whether the force to produce the jar or vibration is directed in the direction of the periphery of the tire or radially to the wheel and that in the use of my device in connection with vehicles, the vibration of the vehicle body will be reduced to a minimum. By providing the side plates 26, the cushion members 14 will be protected from dirt and other foreign matter and will also be guarded against injury by stones or obstacles in the road, the mentioned side plates being so arranged as to not interfere with the proper operation of the cushion members.

I claim:—

In a vehicle wheel, the combination with a wheel body, of spaced cushions secured to the wheel body, each cushion comprising a series of superimposed springs, with the largermost spring of each cushion bent backward upon itself, a rim encircling the wheel body, spaced standards projecting from the inner face of the rim, an eye formed at the end of each backwardly bent portion of the larger spring of each cushion and extending between the standards, a pin connecting the standards and passing through the eye of each cushion, rollers carried by the standards and engaged by each cushion adjacent the backwardly bent portion of the larger spring of each cushion, a tire carried by the said rim, and circular plates secured to the said wheel body and overlapping the said rim adjacent the peripheral edges thereof.

In testimony whereof I affix my signature in presence of two witnesses.

WILLIAM T. THORP.

Witnesses:
F. A. HOSTER,
BENNETT S. JONES.

Copies of this patent may be obtained for five cents each, by addressing the "Commissioner of Patents, Washington, D. C."